(12) United States Patent
Earles et al.

(10) Patent No.: US 11,878,321 B2
(45) Date of Patent: Jan. 23, 2024

(54) BATTERY POWERED FLUID SPRAYER

(71) Applicant: Graco Minnesota Inc., Minneapolis, MN (US)

(72) Inventors: Jeffrey A. Earles, Lakeville, MN (US); Brian M. Mulgrew, St. Francis, MN (US); Jeromy D. Horning, Albertville, MN (US); David J. Thompson, Oak Grove, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 466 days.

(21) Appl. No.: 17/166,556

(22) Filed: Feb. 3, 2021

(65) Prior Publication Data

US 2022/0048055 A1 Feb. 17, 2022

Related U.S. Application Data

(60) Provisional application No. 63/139,065, filed on Jan. 19, 2021, provisional application No. 63/064,395, filed on Aug. 11, 2020.

(51) Int. Cl.
*B05B 9/08* (2006.01)
*B05B 15/625* (2018.01)
*H01M 50/247* (2021.01)
*B05B 9/00* (2006.01)
*B05B 15/63* (2018.01)

(52) U.S. Cl.
CPC ............ *B05B 9/0861* (2013.01); *B05B 9/007* (2013.01); *B05B 15/625* (2018.02); *H01M 50/247* (2021.01); *B05B 15/63* (2018.02); *H01M 2220/30* (2013.01)

(58) Field of Classification Search
CPC ...... B05B 9/0861; B05B 9/007; B05B 15/625; B05B 15/63; B05B 12/32; B05B 12/085; B05B 9/0413; B05B 15/00; H01M 50/247; H01M 2220/30; Y02E 60/10
See application file for complete search history.

(56) References Cited

U.S. PATENT DOCUMENTS

| 5,752,661 A | 5/1998 | Lewis |
| 2007/0204603 A1 | 9/2007 | Jacobs et al. |
| 2015/0050169 A1 | 2/2015 | Horie et al. |

(Continued)

FOREIGN PATENT DOCUMENTS

| CN | 106460833 A | 2/2017 |
| CN | 206064968 U | 4/2017 |

(Continued)

OTHER PUBLICATIONS

First Chinese Office Action for CN Application No. 202110913752. 7, dated Sep. 21, 2022, pp. 10.

(Continued)

*Primary Examiner* — Vishal Pancholi
(74) *Attorney, Agent, or Firm* — Kinney & Lange, P. A.

(57) ABSTRACT

A battery powered fluid sprayer includes a battery mounted to a vertically extending wall of the fluid sprayer. The battery powers an electric motor to power a pump to pump fluid to a spray gun for spraying. The battery is disposed within a battery chamber enclosed by a door. The battery is suspended above a base of the battery chamber to isolate battery from any fluid that may enter the chamber.

19 Claims, 12 Drawing Sheets

(56) References Cited

U.S. PATENT DOCUMENTS

| | | | |
|---|---|---|---|
| 2015/0251223 A1 | 9/2015 | Horie et al. | |
| 2017/0066119 A1 | 3/2017 | Fu et al. | |
| 2018/0154386 A1 | 6/2018 | Zhang | |
| 2019/0224703 A1 | 7/2019 | Gustafson et al. | |
| 2021/0323033 A1* | 10/2021 | Sugiura | H01M 50/247 |

FOREIGN PATENT DOCUMENTS

| | | |
|---|---|---|
| CN | 106794481 A | 5/2017 |
| CN | 108008743 A | 5/2018 |
| CN | 110753602 A | 2/2020 |
| EP | 1863106 A1 | 12/2007 |
| EP | 3159541 A1 | 4/2017 |
| JP | H0634950 A | 2/1994 |
| JP | 2006015208 A | 1/2006 |
| JP | 2012030165 A | 2/2012 |
| JP | 2014100114 A | 6/2014 |
| WO | 2014119130 A1 | 8/2014 |
| WO | 2018132790 A1 | 7/2018 |
| WO | 2018140753 A1 | 8/2018 |
| WO | 2019161995 A1 | 8/2019 |
| WO | 2020044940 A1 | 3/2020 |
| WO | 2022073170 A1 | 4/2022 |

OTHER PUBLICATIONS

First Chinese Office Action for CN Application No. 202110916145.6, dated Sep. 30, 2022, pp. 19.
Extended European Search Report for EP Application No. 21190221.8, dated Jan. 17, 2022, pp. 9.
Extended European Search Report for EP Application No. 21190220.0, dated Jan. 19, 2022, 8 pages.

* cited by examiner

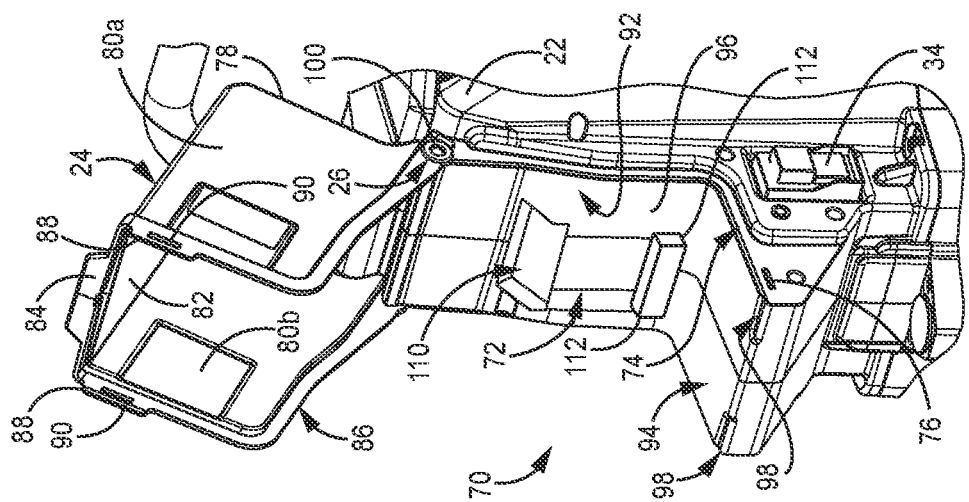
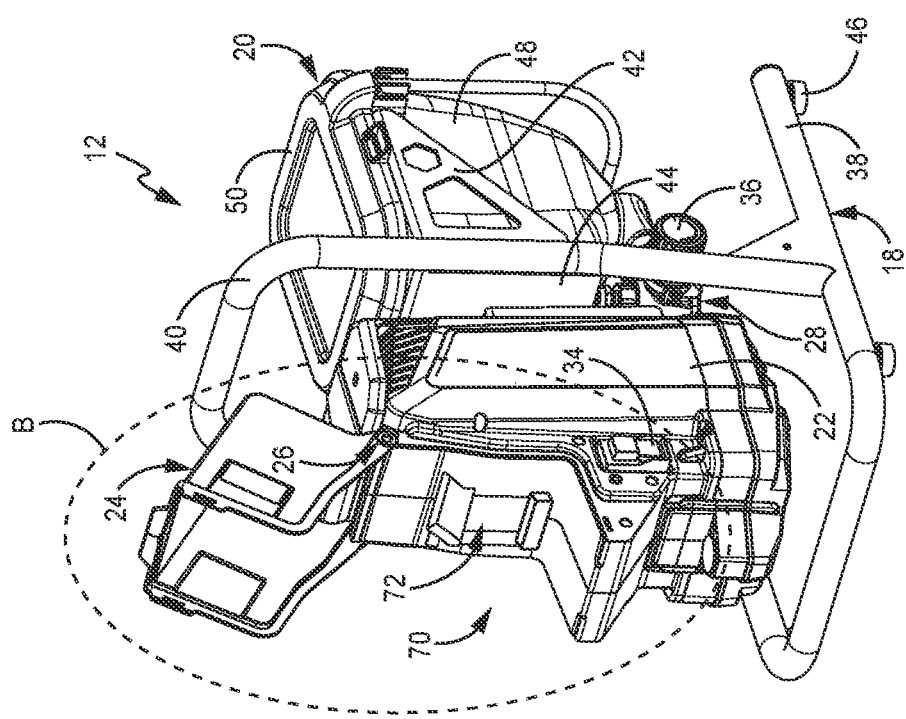
FIG. 3B
FIG. 3A

BATTERY POWERED FLUID SPRAYER

CROSS-REFERENCE TO RELATED APPLICATION(S)

This application claims the benefit of U.S. Provisional Application No. 63/064,395 filed Aug. 11, 2020, and entitled "BATTERY POWERED FLUID SPRAYER," and claims the benefit of U.S. Provisional Application No. 63/139,065 filed Jan. 19, 2021, and entitled "BATTERY POWERED FLUID SPRAYER," the disclosures of which are hereby incorporated by reference in their entirety.

BACKGROUND

The present disclosure relates generally to fluid sprayers. More specifically, the disclosure relates to battery powered fluid sprayers.

Sprayers apply fluid to a surface through a nozzle. A pump draws the spray fluid from a reservoir, pressurizes the fluid, and drives the fluid downstream to a spray gun where the fluid is emitted as a spray through the nozzle. The pump can be powered in various manners, such as electrically, pneumatically, or hydraulically. Electrically powered pumps typically receive AC power from a power cord connected to a wall outed to receive constant and unlimited electric power. Sprayers can be configured to spray various fluids such as paint, varnish, finishing, or other type of coating. The fluid sprayed can be a sanitary fluid, such as for sterilization, cleaning, deodorizing, or another health-related application.

SUMMARY

According to one aspect of the disclosure, a fluid sprayer includes a reservoir supported by a frame; an electric motor; a battery supported by a drive housing and electrically connected to the electric motor to provide power to the electric motor, wherein the drive housing is supported by the frame; and a pump operatively connected to the electric motor to be driven by the electric motor, wherein the pump is configured to pump fluid from the reservoir.

According to an additional or alternative aspect of the disclosure, a mounting assembly for a fluid sprayer includes a drive housing containing an electric motor; a door movably connected to the drive housing, the door configured to move between a closed state and an open state; a battery compartment having a base wall formed by the drive housing, a back wall formed by the drive housing, and further defined by the door. The back wall supports a battery within the battery compartment such that air gaps are formed between the battery and the base wall and between the battery and the door and such that the battery does not contact any of the base wall and the door.

BRIEF DESCRIPTION OF THE DRAWINGS

FIG. 3A is an isometric view of a fluid sprayer with the door in the open state and the battery removed.
FIG. 3B is an enlarged view of detail B in FIG. 3A.

DETAILED DESCRIPTION

This disclosure relates generally to battery powered fluid sprayers. The battery powered sprayer can spray various fluids, such as paint, varnish, finishing, or other type of coating. The fluid sprayed can be a sanitary fluid, such as for sterilization, cleaning, deodorizing, or another health-related application. A battery provides electric power to an electric motor that powers a pump. The pump pumps fluid under pressure from a reservoir to a spray gun. The fluid is emitted under pressure from a nozzle of the spray gun as a fluid spray.

Figure 1A:
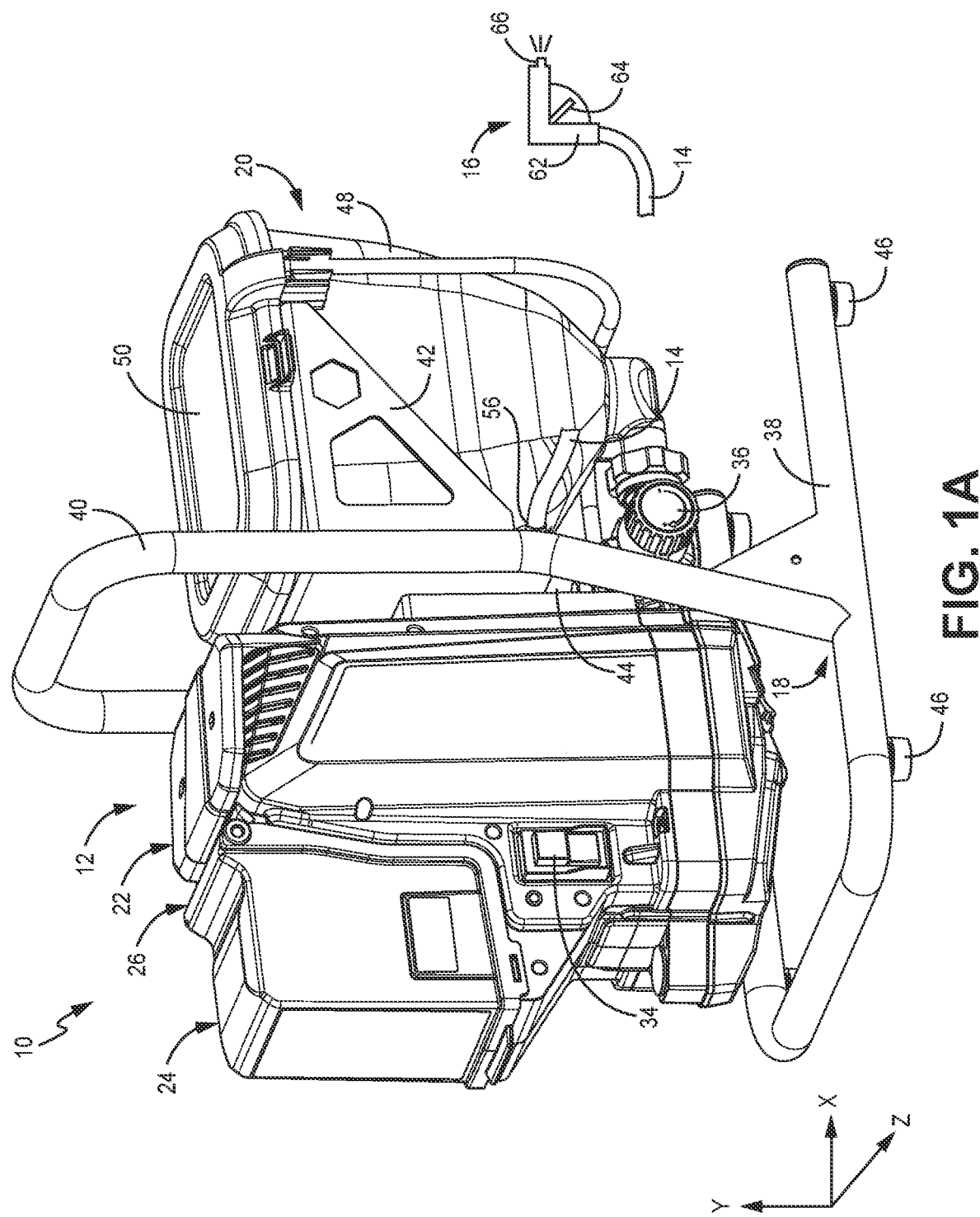
FIG. 1A is an isometric view of a spray system.
Figure 1B:
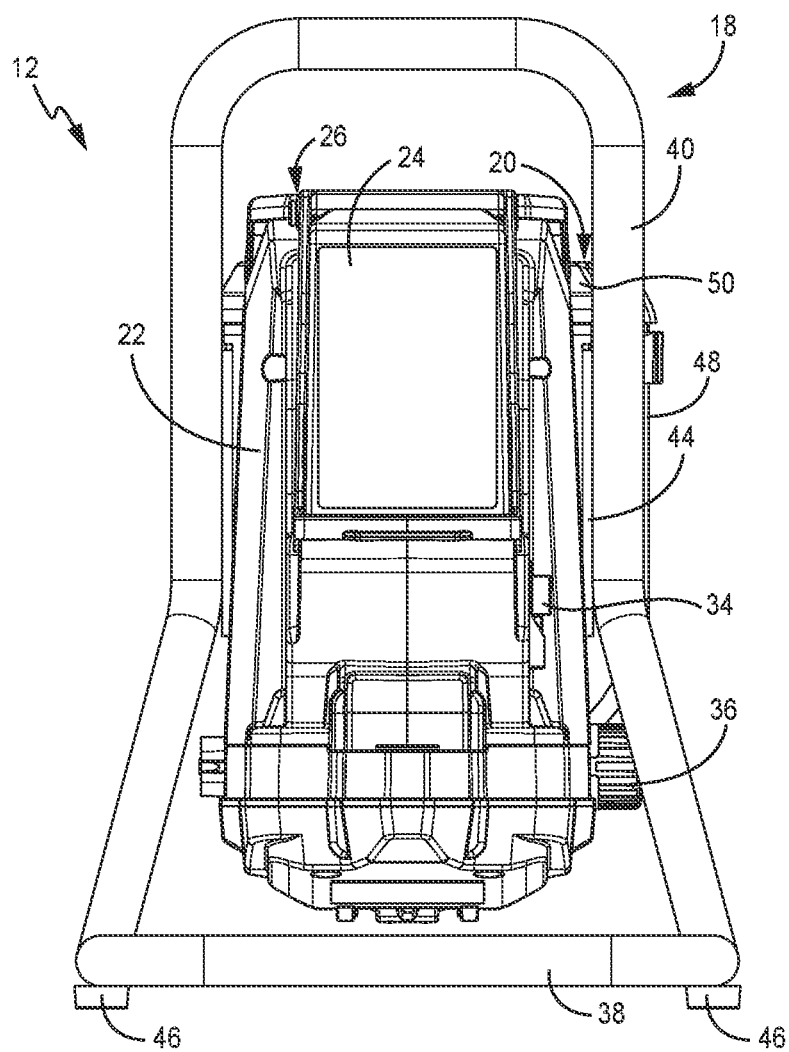
FIG. 1B is a front elevation view of a fluid sprayer.
Figure 1C:
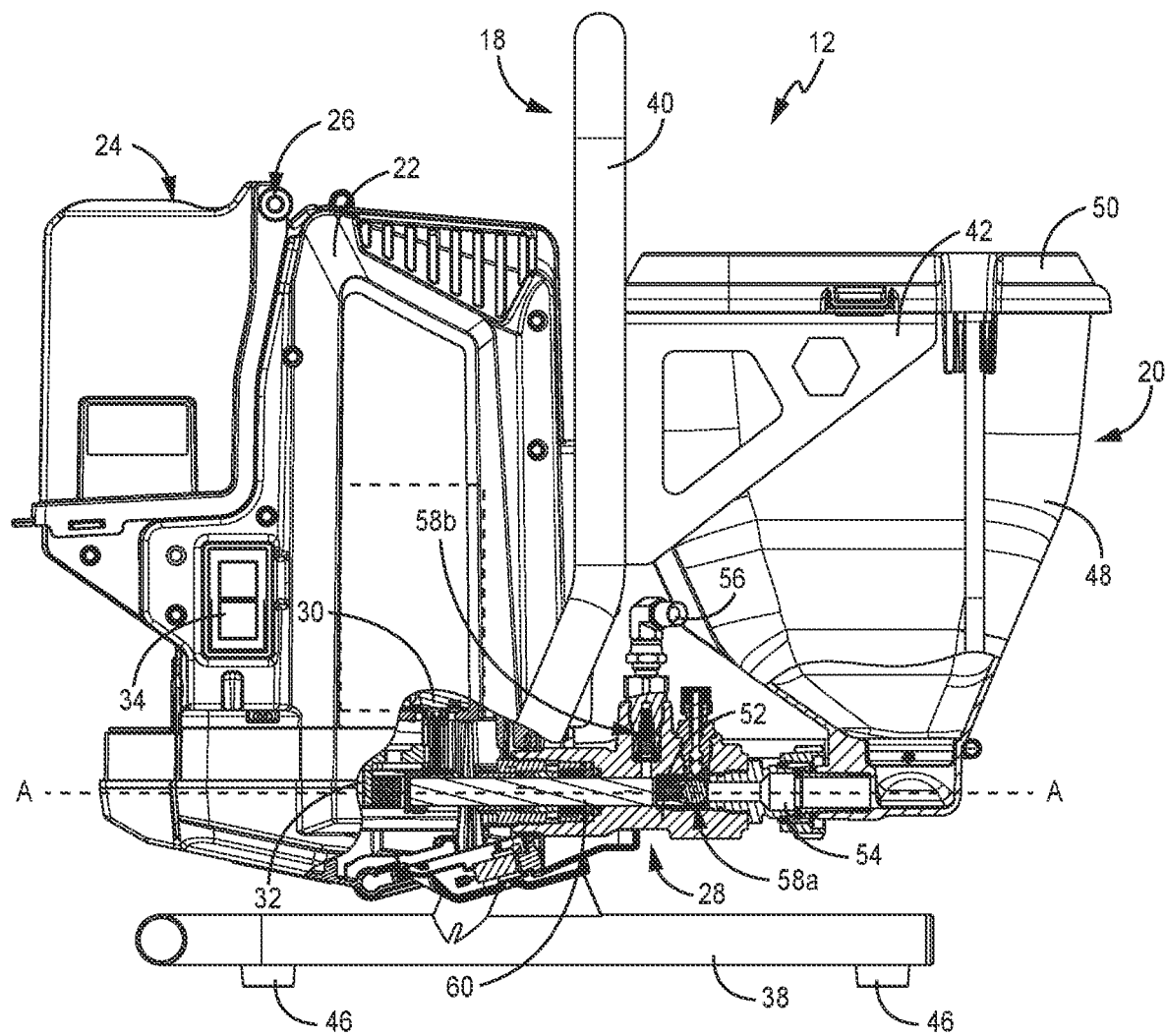
FIG. 1C is a side elevation, partial cross-sectional view of a fluid sprayer.

FIG. 1A is an isometric view of spray system 10. FIG. 1B is a front elevation view of fluid sprayer 12. FIG. 1C is a side elevation, partial cross-sectional view of fluid sprayer 12. FIGS. 1A-1C will be discussed together. Spray system 10 includes fluid sprayer 12, hose 14, and spray gun 16. Fluid sprayer 12 includes frame 18, reservoir 20, housing 22, door 24, hinge 26, pump 28, motor 30, drive 32, switch 34, and pressure control 36. Frame 18 includes base portion 38, vertical portion 40, brackets 42, plate 44, and feet 46. Reservoir 20 includes reservoir body 48 and lid 50. Pump 28 includes pump body 52, pump inlet 54, pump outlet 56, check valves 58a, 58b, and piston 60. Spray gun 16 includes handle 62, trigger 64, and nozzle 66. As used herein, the terms "vertical" and "vertically" mean along direction Y, the terms "lateral" and "laterally" mean along direction Z, and the terms "longitudinal" and "longitudinally" mean along direction X.

Frame 18 supports other components of fluid sprayer 12 relative to a ground surface. Frame 18 includes base portion 38 that is oriented generally horizontally, parallel to the ground surface. Base portion 38 is disposed in the X-Z plane. In the example shown, base portion 38 is a U-shaped frame with a closed end of the U-shape disposed under the battery compartment covered by door 24 and the open end under reservoir 20. It is understood, however, that base portion 38 can be of any desired configuration. Base portion 38 can be formed from metallic tubing. In the example shown, feet 46 extend from base portion 38 to contact the ground surface and support the other parts of fluid sprayer 12 on the ground surface. Vertical portion 40 extends from a top side of base portion 38 and is connected to the two opposite legs of base portion 38. Vertical portion 40 can be grasped by a user to pick up and carry fluid sprayer 12 to reposition fluid sprayer 12 at a desired location for spraying. For example, a user can grasp the lateral top of vertical portion 40. As such, vertical portion 40 can be considered to form a handle of fluid sprayer 12. Vertical portion 40 can be formed by metallic tubing. Brackets 42 (only one of which is shown) extend from opposite vertical legs of vertical portion 40. Brackets 42 extend longitudinally away from housing 22 and are configured to interface with reservoir 20 to support reservoir 20 on frame 18. Plate 44 extends between and connects the opposite vertical legs of vertical portion 40. Housing 22 is connected to plate 44 such that plate 44 supports housing 22 on frame 18.

Reservoir 20, which can also be referred to as a hopper, is supported by frame 18. Reservoir body 48 is configured to store a supply of spray fluid for spraying. Reservoir body 48 interfaces with brackets 42 to mount reservoir 20 to frame 18. Lid 50 is disposed over a top opening of reservoir body 48. A seal can be formed between lid 50 and the lip of reservoir body 48 defining the top opening to seal the fluid within reservoir 20 and prevent splashing or other leaking of fluid from reservoir 20.

Housing 22 is supported by frame 18. In the example shown, housing 22 is connected to plate 44, such as by bolts, screws, or other fasteners. As such, plate 44 can be disposed between and separate the electronic components of fluid sprayer 12, which are disposed in and/or supported by housing 22, from the fluid stored in reservoir 20. Motor 30 is disposed within housing 22. Motor 30 is an electric motor such as a brushed or brushless direct current (DC) motor or alternating current (AC) induction motor, among other options. Motor 30 is operably connected to piston 60 to drive reciprocation of piston 60 along pump axis A-A to cause pumping by pump 28. Drive 32 is disposed within housing 22 and is configured to convert a rotational output from motor 30 into a linear reciprocating input to piston 60. Drive 32 can be of any form suitable for converting the rotational output to a linear reciprocating input, such as a cam, wobble plate, scotch yoke, or eccentric crank, among other options. In some examples, housing 22 is formed as a clamshell housing that encloses various components of fluid sprayer 12, such as motor 30.

Switch 34 is disposed on housing 22 and is configured to control the power of fluid sprayer 12 on and off. Pressure control 36 is configured to control the output pressure for controlling operation of pump 28. In the example shown, pressure control 36 is a dial configured to increase or decrease tension on a spring to increase or decrease a threshold pressure at which a sensed output pressure from the pump 28 opens or closes a switch for communicating a command signal to control circuitry of fluid sprayer 12. The command signal can cause the control circuitry to provide power to motor 30 to operate motor 30.

Door 24 is supported by housing 22. Door 24 encloses a battery compartment that a battery of fluid sprayer 12 is disposed within, as discussed in more detail below. Door 24 is connected to housing 22 at hinge 26. Door 24 can pivot about hinge 26 between a closed state (shown in FIGS. 1A-1C) and an open state, as discussed in more detail below.

Pump 28 interfaces with reservoir 20 and is configured to pump fluid from reservoir 20 downstream through hose 14 to spray gun 16 for spraying by spray gun 16. Piston 60 is configured to reciprocate within pump body 52 along axis A-A to pump the fluid. The spray fluid is draw into pump 28 through pump inlet 54 and pumped downstream out of pump 28 through pump outlet 56. In the example shown, pump outlet 56 is disposed vertically above the reciprocation axis A-A of piston 60. Check valve 58a is disposed upstream of piston 60 and forms an inlet check valve of pump 28. Check valve 58b is disposed downstream of piston 60 and forms an outlet check valve of pump 28. Check valves 58a, 58b are one-way valves that allow flow from upstream to downstream and prevent flow from downstream to upstream. Check valves 58a, 58b can be ball valves, among other options.

During operation, the user can grasp handle 62 of spray gun 16 and pull trigger 64 to initiate spraying. Motor 30 is powered and generates the rotational output. Drive 32 receives the rotational output and converts that rotational output into linear reciprocating motion of piston 60. Piston 60 is drawn in a first axial direction (towards drive 32) through a suction stroke during which the volume of a chamber between the face of piston 60 and check valve 58a expands, causing check valve 58a to open and check valve 58b to close. Fluid is drawn into pump 28 through pump inlet 54 and into the chamber through check valve 58a. After completing the suction stroke, drive 32 turns over and drives piston in a second axial direction (towards check valve 58a) through a pressure stroke during which the volume of the chamber decrease. The reducing volume pressurizes the fluid in the chamber, causing check valve 58a to close and check valve 58b to open. The fluid in the chamber flows downstream through check valve 58b and out of pump outlet 56 to hose 14. The fluid flows through hose 14 to spray gun 16 where the fluid is emitted through nozzle 66 as an atomized fluid spray.

Figure 2B:
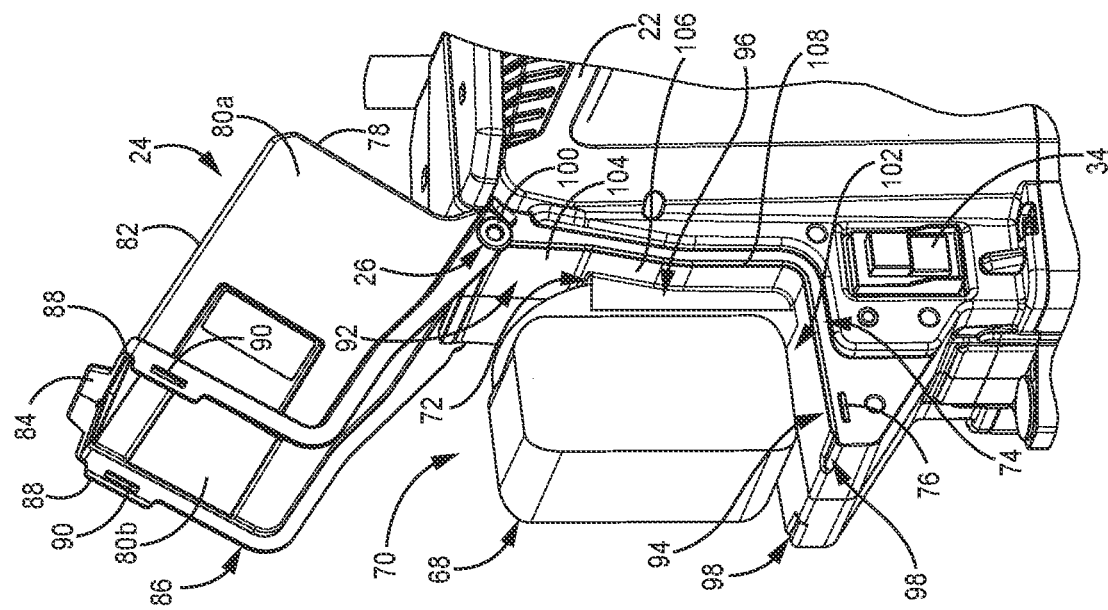
FIG. 2B is an enlarged view of detail B in FIG. 2A.
Figure 2A:
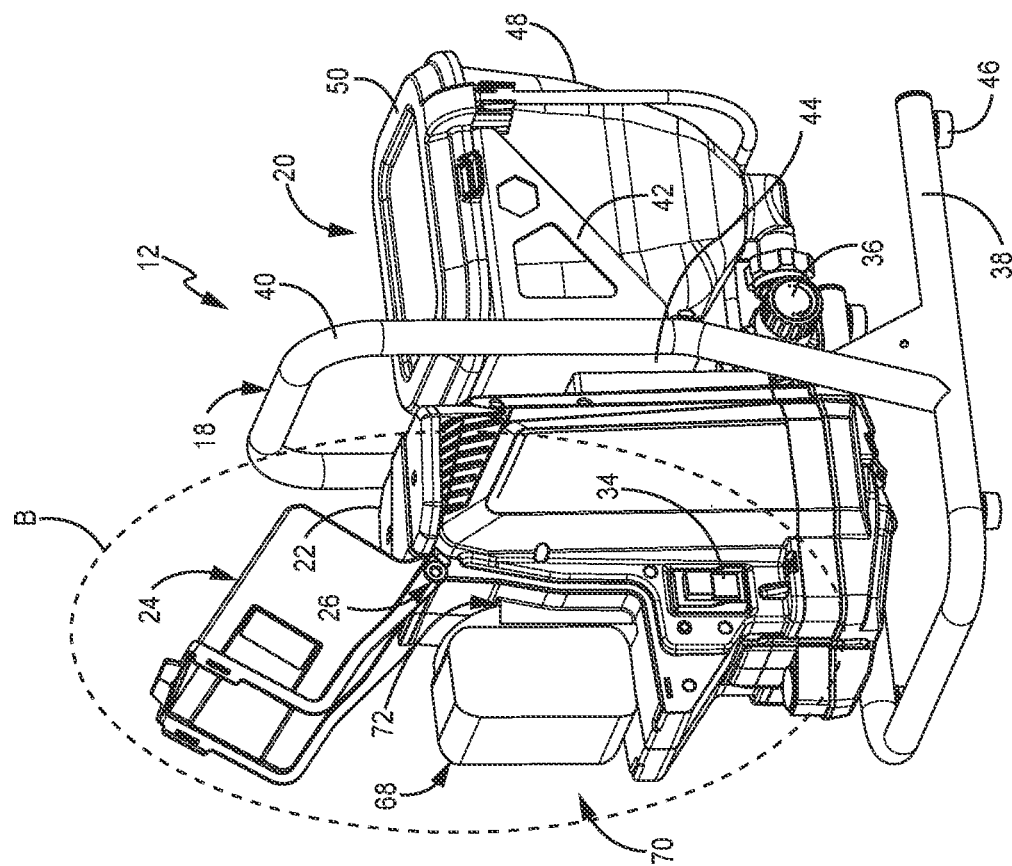
FIG. 2A is an isometric view of a fluid sprayer with a door in an open state.
Figure 2C:
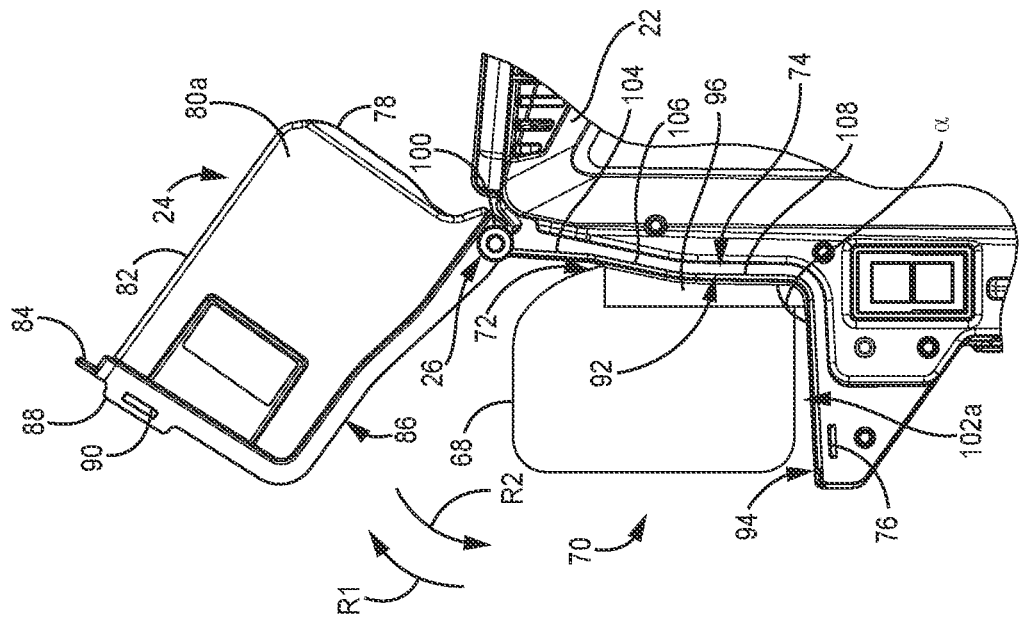
FIG. 2C is a side elevation view of a fluid sprayer with the door in the open state.
Figure 2D:
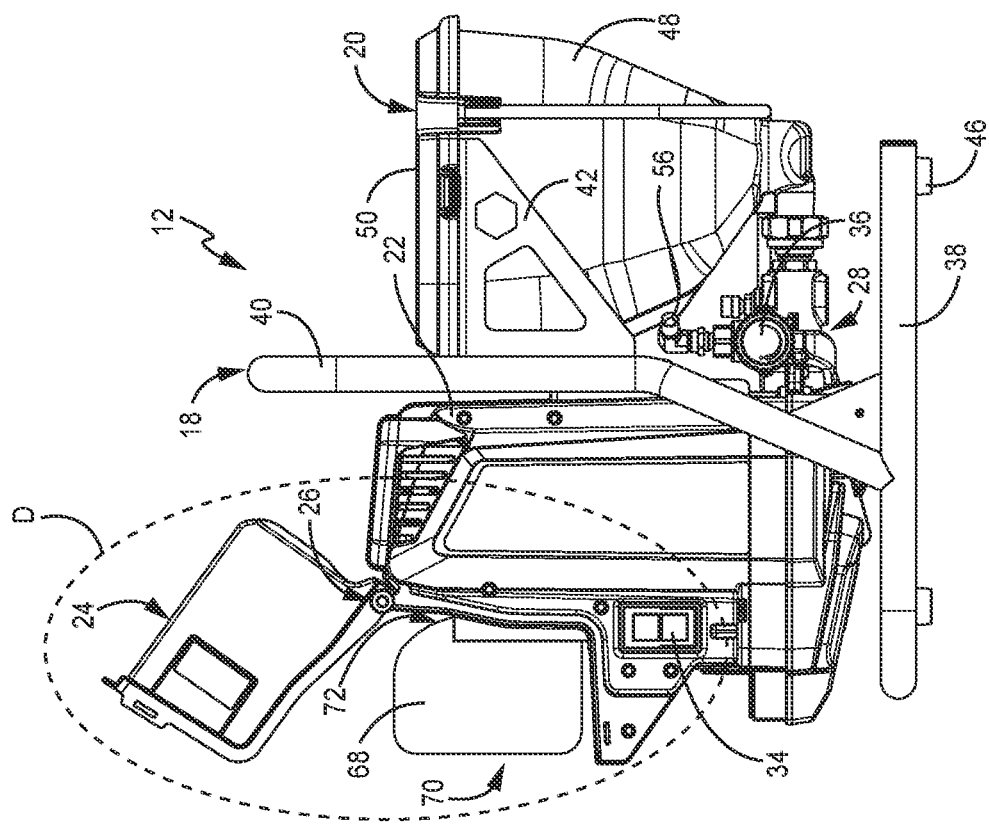
FIG. 2D is an enlarged view of detail D in FIG. 2C.

FIG. 2A is an isometric view of fluid sprayer 12 showing door 24 in an open state. FIG. 2B is an enlarged view of detail B in FIG. 2A. FIG. 2C is a side elevation view of fluid sprayer 12 showing door 24 in the open state. FIG. 2D is an enlarged view of detail D in FIG. 2C. FIGS. 2A-2D will be discussed together. Frame 18, reservoir 20, housing 22, door 24, hinge 26, pump 28, switch 34, pressure control 36, battery 68, battery compartment 70, and mounting slot 72 of fluid sprayer 12 are shown. Frame 18 includes base portion 38, vertical portion 40, brackets 42, plate 44, and feet 46. Reservoir 20 includes reservoir body 48 and lid 50. Housing 22 includes recess 74 and projections 76. Door 24 includes top wall 78; door lateral walls 80a, 80b; front wall 82, grip 84, lip 86, tabs 88, slots 90. Back wall 92, base wall 94, protrusion 96, and depressions 98 of battery compartment 70 are shown.

Door 24 is connected to housing 22 at hinge 26. For example, door 24 can include connectors 100 at opposite lateral sides of door 24 through which one or more pins can extend to form pivot points that connect door 24 to housing 22. Door 24 is configured to pivot in direction R1 from the closed state (FIGS. 1A-1C) to the open state. Door 24 is configured to pivot in direction R2 from the open state to the closed state. Door 24 encloses battery 68 within battery compartment 70 when in the closed state. Battery 68 is exposed and can be accessed by a user with door 24 in the open state. Door 24 is connected to housing 22 such that door 24 balanced open when in the open state. Door 24 is configured to self-close when moved in direction R2 from the open state. As such, the user is not required to fully close door 24 but can instead nudge door 24 in direction R2 and door 24 will fall to the closed state. Door 24 being balanced open and configured to fall to the closed state prevents door 24 from being inadvertently left in the open state after replacement or installation of battery 68, preventing fluid migration into battery compartment 70.

Door 24 is configured to enclose battery compartment 70 with door 24 in the closed state. Battery compartment 70 is defined by housing 22 and door 24. In the example shown, battery compartment 70 is a six-sided chamber within which battery 68 is disposed during operation. Battery compartment 70 is defined by back wall 92, base wall 94, top wall 78, door lateral walls 80a, 80b, and front wall 82. In the example shown, four of the six walls defining battery compartment 70 are formed by door 24 and two of the six sides defining battery compartment 70 are formed by housing 22. In some examples, door 24 entirely encloses back wall 92 and base wall 94 when door 24 is in the closed state.

Lip 86 extends around a periphery of door 24 between the two lateral edges of hinge 26. Lip 86 is formed at the edges of door lateral wall 80a, door lateral wall 80b, and front wall 82. Lip 86 can continuously extend about the edge of door 24. Lip 86 represents a widening of door 24 relative to door lateral walls 80a, 80b and front wall 82. Lip 86 is configured to be received by recess 74 formed by housing 22. Recess 74 represents a narrowing of housing 22 and is disposed adjacent back wall 92 and base wall 94 at the edges of back wall 92 and base wall 94. In the example shown, recess 74 extends around the three edges of base wall 94 and the two lateral sides of back wall 92. Lip 86 is received by and disposed within recess 74 when door 24 is in the closed state. Door 24 overlaps with housing 22 at the interface between lip 86 and recess 74 to form a sealing interface that inhibits fluid migration to battery compartment 70.

Grip 84 extends from front wall 82 of door 24. In the example shown, grip 84 extends from a lower end of front wall 82. In the example shown, grip 84 extends from a portion of front wall 82 formed by lip 86. In the example shown, a width of grip 84 is less than a width of front wall 82 between door lateral walls 80a, 80b. Grip 84 provides an interface for the user to grasp and actuate door 24 between the closed and open states. Tabs 88 project from door lateral walls 80a, 80b. Tabs 88 extend away from top wall 78. Tabs 88 are disposed at the front, lower ends of door 24 proximate the interface between door lateral walls 80a, 80b and front wall 82. In the example shown, tabs 88 extend from lip 86 such that a width between tabs 88 is larger than a width between door lateral walls 80a, 80b at the interface between door lateral walls 80a, 80b and top wall 78. Slots 90 are formed through tabs 88. Projections 76 (only one of which is shown) extend from opposite lateral sides of housing 22. In the example shown, projections 76 extend from within recess 74. Tabs 88 are configured to extend over projections 76. Projections 76 are received by slots 90 to maintain door 24. The interface between projections 76 and slots 90 can maintain door 24 in the closed state and can prevent over-rotation of door 24 in direction R2.

Back wall 92 is substantially vertically oriented. Back wall 92 is formed as part of housing 22 and thereby serves as both a part of the battery compartment 70 containing battery 68 and the motor enclosure containing motor 30 (FIG. 1C). Base wall 94 is substantially horizontally oriented. Base wall 94 is formed as part of housing 22.

Base wall 94 is sloped downward and away from the interface between base wall 94 and back wall 92. Base wall 94 is transverse to an X-Z plane. A line tangential to base wall 94 is transverse to the axis A-A (FIG. 1C) that piston 60 (FIG. 1C) reciprocates along. Base wall 94 is sloped to guide fluid away from battery 68 and prevent fluid from pooling in battery compartment 70. Base wall 94 is slanted away from back wall 92 and downward to route any fluid that penetrates battery compartment 70 away from battery 68 and back wall 92. The sloping of base wall 94 prevents wicking of the fluid to moisture sensitive components, such as switch 34.

Depressions 98 are formed on base wall 94 at the periphery of base wall 94. In the example shown, a first depression 98 is formed at the front end of base wall 94 at a first lateral side of base wall 94 and a second depression 98 is formed at the front end of base wall 94 at a second lateral side of base wall 94. In the example shown, depressions 98 are located at the two corners of base wall 94 opposite back wall 92. Depressions 98 are formed in recess 74 such that lip 86 vertically overlaps with depressions 98 with door 24 in the closed state. Depressions 98 form drains at the edges of base wall 94 that allow fluid that does enter into battery compartment 70 to drain from battery compartment 70 and out past door 24 even when door 24 is in the closed state.

Back wall 92 is angled relative to vertical at the interface between back wall 92 and base wall 94. Back wall 92 tilts away from base wall 94 to facilitate fluid running along back wall 92 to base wall 94. In the example show, back wall 92 includes first portion 104, second portion 106, and third portion 108. First portion 104, second portion 106, and third portion 108 are vertically stacked. First portion 104 extends vertically downward from proximate hinge 26. Second portion 106 extends between first portion 104 and second portion 106. Third portion 108 extends from second portion 106 to the interface of back wall 92 and base wall 94. In the example shown, each of first portion 104, second portion 106, and third portion 108 are angled relative to vertical. In the example shown, second portion 106 is offset relative to vertical to a greater extent than either first portion 104 or third portion 108. Each of first portion 104, second portion 106, and third portion 108 are transverse to vertical. A line tangential to any one of first portion 104, second portion 106, and third portion 108 is transverse to axis A-A but not orthogonal to axis A-A. As best seen in FIG. 2D, angle α at the interface between back wall 92 and base wall 94 is an obtuse angle greater than 90-degrees.

Battery 68 is mounted to back wall 92. As such, battery 68 hangs from a vertically oriented surface. Battery 68 is mounted to back wall 92 such that battery 68 hangs from back wall 92. In some examples, battery 68 is mounted to back wall 92 by a sliding interface. More specifically, battery 68 is mounted to mounting slot 72 formed on back wall 92. Battery 68 can slide vertically upward and away from base wall 94 to dismount battery 68. Battery 68 can slide vertically downward and towards base wall 94 to mount battery 68. Mounting slot 72 is formed in a protrusion 96 that extends into battery compartment 70 from back wall 92. Gap 102a is disposed between battery 68 and base wall 94. Battery 68 does not contact base wall 94. Gap 102a prevents any fluid on base wall 94 of battery compartment 70 from wicking to the moisture sensitive battery 68. As discussed in more detail below, air gaps are also formed between battery 68 and door 24 such that battery 68 is spaced from each of top wall 78, door lateral wall 80a, door lateral wall 80b, and front wall 82 of door 24. Battery compartment 70 shields battery 68 from the spray fluid during spray operations. For example, overspray, which is spray fluid that does not adhere to a surface, can be present in the air around fluid sprayer 12 during spraying. Battery compartment 70 and the walls defining battery compartment 70 shield battery 68 from the fluid and route the fluid away from battery 68.

Battery 68 is disposed at a first end of fluid sprayer 12 and reservoir 20 is disposed at a second end of fluid sprayer 12. The portion of housing 22 that houses the electric motor 30 is disposed between battery 68 and reservoir 20. Pump 28 is located vertically below battery 68, motor 30, and reservoir 20. Battery 68 is disposed vertically above pump outlet 56 and is spaced longitudinally relative to pump outlet 56. At least a portion of frame 18 is disposed between battery 68 and reservoir 20. As best seen in FIG. 2D, battery 68 is disposed within battery compartment 70 and mounted to housing 22 such that battery 68 is neither higher nor lower than the portions of housing 22 containing motor 30. As such, a full vertical height of battery is overlapped by housing 22 with battery 68 mounted to housing 22.

Fluid sprayer 12 provides significant advantages. Battery 68 provides power to electronic components of fluid sprayer 12, such as the electric motor 30. Fluid sprayer 12 can thereby be operated at various locations where wall power is not readily accessible. In addition, fluid sprayer 12 can be moved during the spray job without having to plug and unplug fluid sprayer 12. Battery 68 is disposed within battery compartment 70 and shielded from fluid spray by door 24 and housing 22. Back wall 92 and base wall 94 are configured to guide any fluid that does enter into battery compartment 70 away from battery and to the edges of base wall 94 so the fluid can exit battery compartment 70 and does not pool in battery compartment 70. Battery 68 is elevated above base wall 94 to prevent migration of fluid to the moisture sensitive battery 68. The configuration of battery compartment 70 and mounting of battery 68 facilitate use of the battery powered fluid sprayer 12 even in overspray heavy environments.

FIG. 3A is an isometric view of fluid sprayer 12 with door 24 in the open state and battery 68 (FIGS. 2A-2D and 4A-4D) removed. FIG. 3B is an enlarged view of detail B in FIG. 3A. FIGS. 3A and 3B will be discussed together. Frame 18, reservoir 20, housing 22, door 24, hinge 26, pump 28, switch 34, pressure control 36, battery compartment 70, and mounting slot 72 of fluid sprayer 12 are shown. Frame 18 includes base portion 38, vertical portion 40, brackets 42, plate 44, and feet 46. Reservoir 20 includes reservoir body 48 and lid 50. Housing 22 includes recess 74 and projections 76. Door 24 includes top wall 78; door lateral walls 80a, 80b; front wall 82, grip 84, lip 86, tabs 88, slots 90, and connectors 100. Back wall 92, base wall 94, protrusion 96, and depressions 98 of battery compartment 70 are shown. Mounting slot 72 includes top opening 110.

Mounting slot 72 is formed in protrusion 96 that extends into battery compartment 70 from back wall 92. Protrusion 96 spaces the top opening 110 of mounting slot 72 from back wall 92. Spacing the top opening 110 from back wall 92 further inhibits any potential fluid migration to battery 68. In the example shown, protrusion 96 extend to and blends with base wall 94. However, no portion of mounting slot 72 is formed in or on base wall 94. The lowest portion of mounting slot 72 is spaced vertically above base wall 94. Battery 68 can be mounted to and removed from mounting slot 72 through the top opening 110. Battery 68 can be moved vertically out of mounting slot 72 away from pump axis A-A and base wall 94 and through top opening 110 to dismount battery 68 from fluid sprayer 12. Battery 68 is pulled away from base wall 94 during removal, preventing contact between battery 68 and any fluid that may be present on base wall 94.

Prongs 112 project from protrusion 96 into battery compartment 70 and away from back wall 92. In the example show, two prongs 112 are disposed on opposite lateral sides of mounting slot 72, one on each side. Prongs 112 are disposed proximate the bottom end of mounting slot 72. Prongs 112 can provide surfaces that support battery 68 when battery 68 is mounted to mounting slot 72.

Figure 4A:
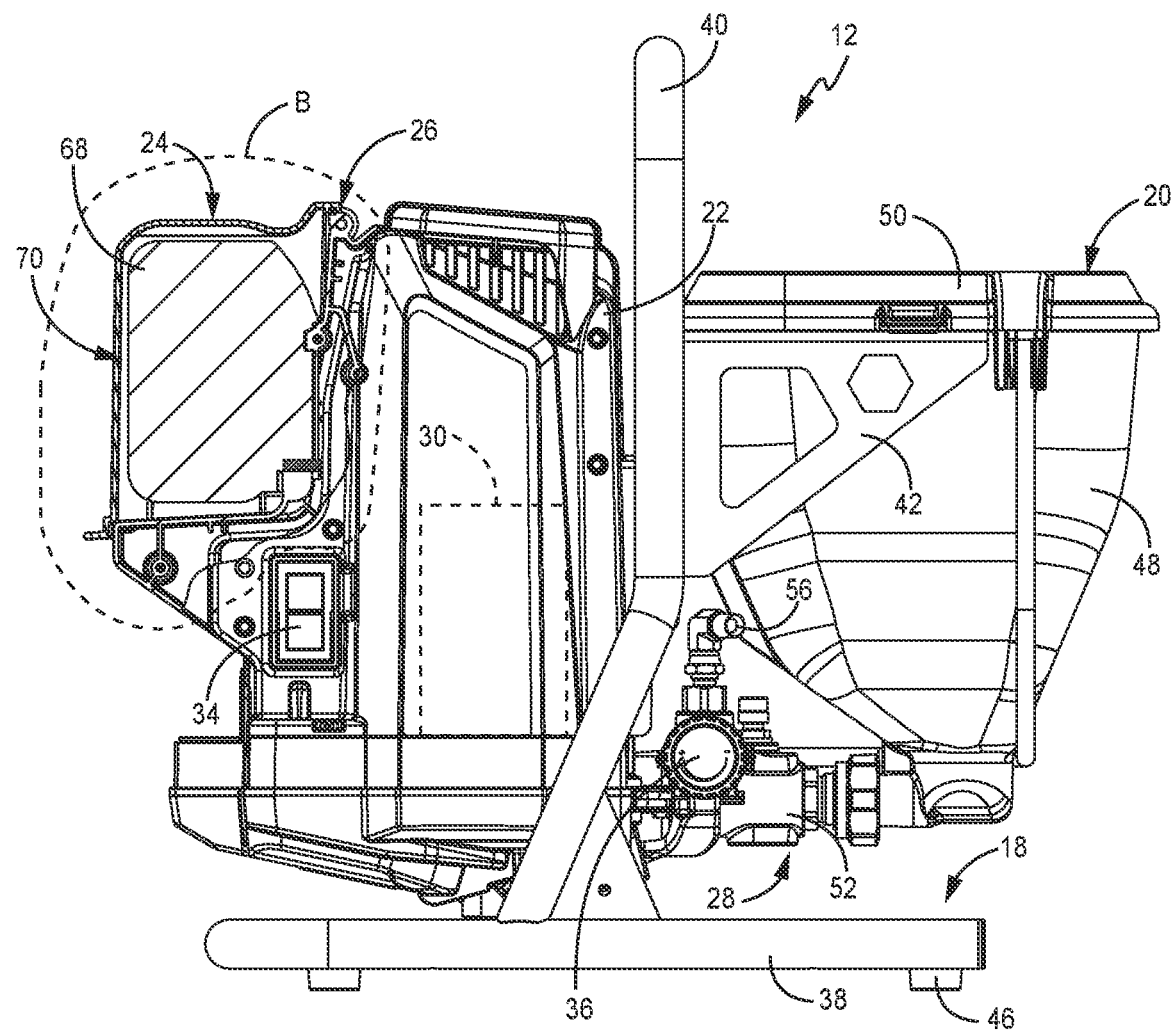
FIG. 4A is a side elevation view of a fluid sprayer showing a partial cross-sectional view of the battery and the battery compartment and with the door in a closed state.
Figure 4B:
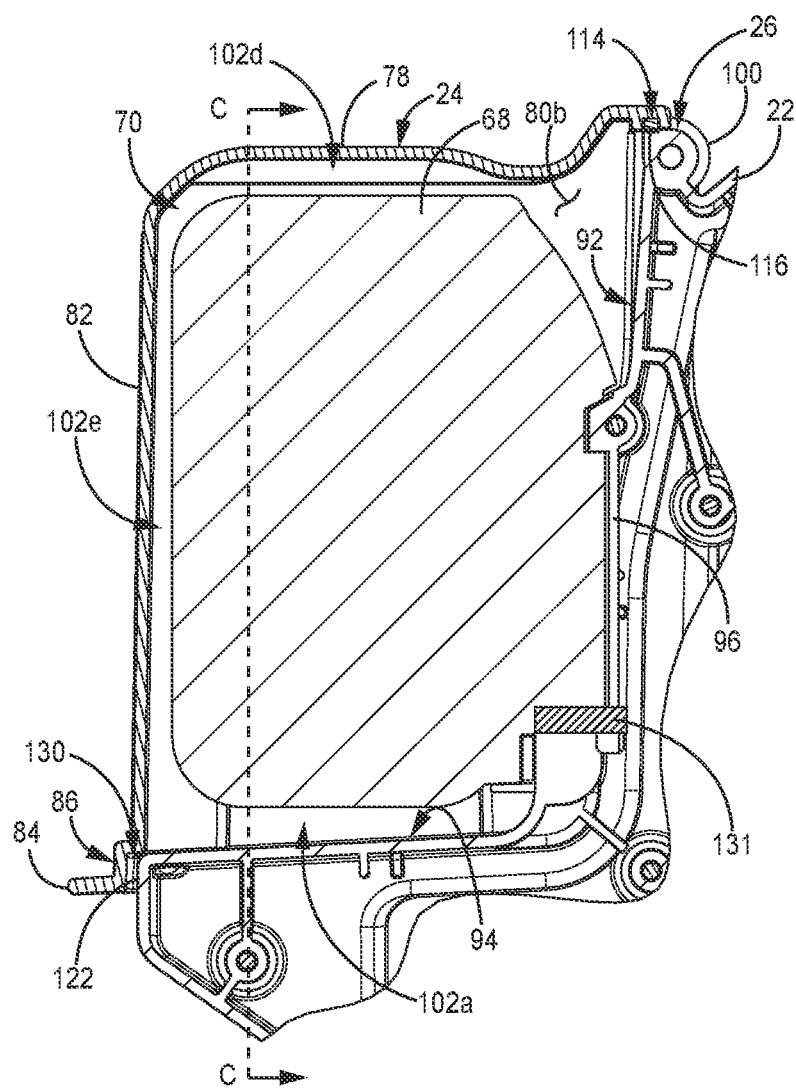
FIG. 4B is an enlarged view of detail B in FIG. 4A.
Figure 4C:
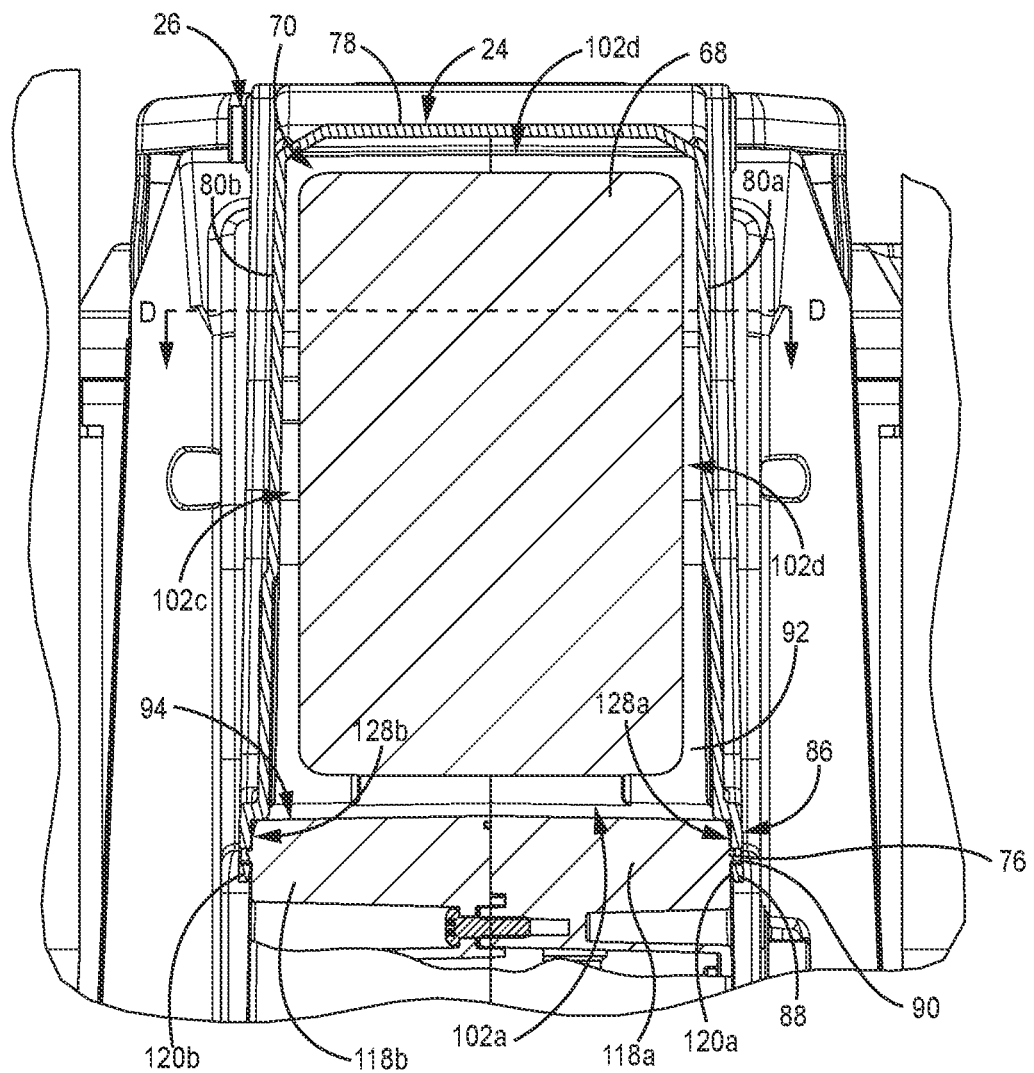
FIG. 4C is a cross-sectional view taken along line C-C in FIG. 4B.
Figure 4D:
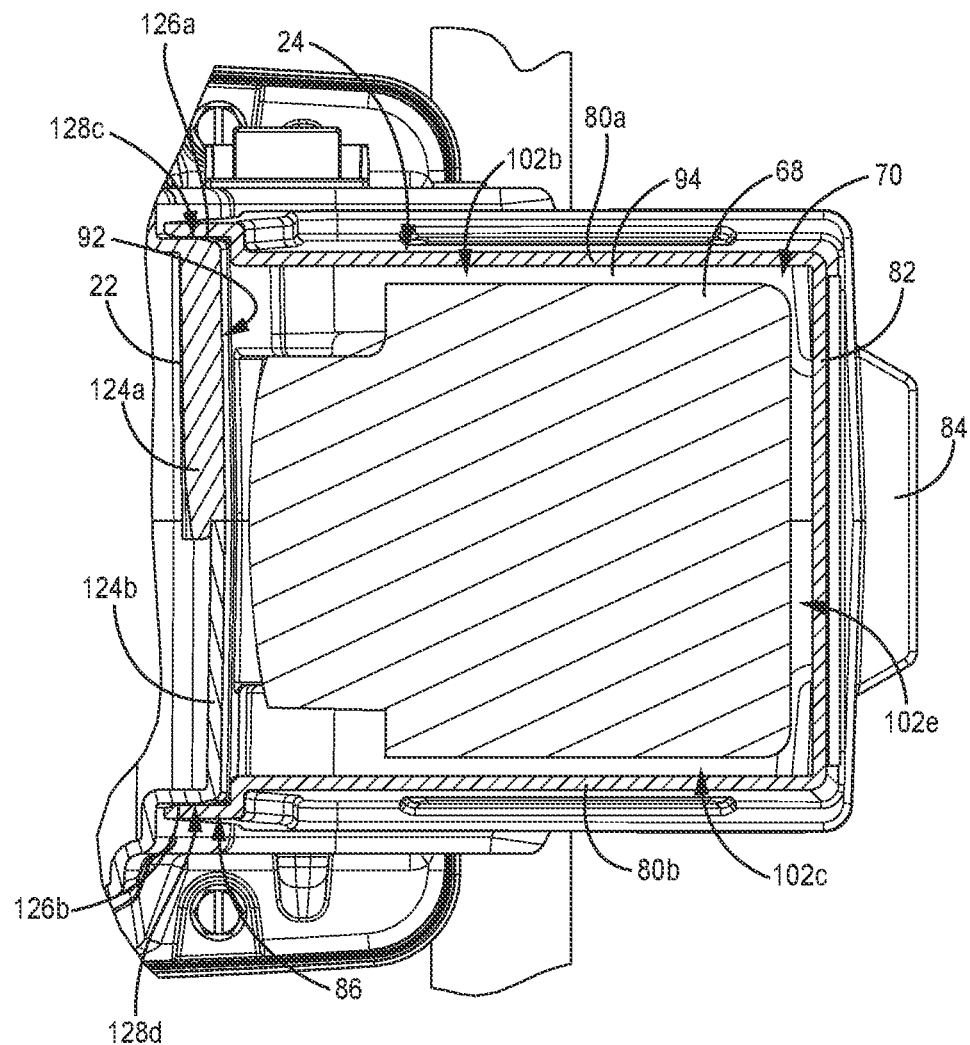
FIG. 4D is a cross-sectional view taken along line D-D in FIG. 4C.

FIG. 4A is a side elevation view of fluid sprayer 12 showing a partial cross-sectional view of battery compartment 70 with door 24 in the closed state. FIG. 4B is an enlarged view of detail B in FIG. 4A. FIG. 4C is an enlarged cross-sectional view taken along line C-C in FIG. 4B. FIG. 4D is an enlarged cross-sectional view taken along ling D-D in FIG. 4C. FIGS. 4A-4D will be discussed together. Frame 18, reservoir 20, housing 22, door 24, hinge 26, pump 28, motor 30, switch 34, pressure control 36, battery 68, and battery compartment 70 of fluid sprayer 12 are shown. Base portion 38, vertical portion 40, bracket 42, and feet 46 of frame 18 are shown. Reservoir 20 includes reservoir body 48 and lid 50. Pump body 52 and pump outlet 56 of pump 28 are shown. Door 24 includes top wall 78; door lateral walls 80a, 80b; front wall 82, grip 84, lip 86, connector 100, seal groove 114, and seal 116. Back wall 92, base wall 94, and protrusion 96, of battery compartment 70 are shown. Base wall 94 includes base lateral portion 118a, base lateral portion 118b, base lateral edge 120a, base lateral edge 120b, and front end 122. Back wall 92 includes back lateral portion 124a, back lateral portion 124b, back lateral edge 126a, and back lateral edge 126b.

Door 24 encloses battery compartment 70 with door 24 in the closed state. Door 24 is pivotably connected to housing 22 at hinge 26. Seal groove 114 is formed on door 24 proximate hinge 26. Seal groove 114 extends laterally across door 24. In the example shown, seal groove 114 extends between connectors 100 (FIGS. 2A-3B) of door 24 that connect door 24 to housing 22 to form hinge 26. Seal 116 is disposed within seal groove 114 and forms a gasket seal between door 24 and housing 22. Seal 116 can be an elastomer seal, among other options. Seal 116 is configured to interface with housing 22 to form a fluid tight seal between door 24 and housing 22. The fluid tight seal is formed at the vertically highest interface location between door 24 and housing 22, which is the location where spray fluid is most likely to infiltrate battery compartment 70. The fluid tight seal is disposed above the top opening of mounting slot 72 to prevent fluid from entering battery compartment 70 at a location where the fluid could flow downward along back wall 92 to top opening 110 (best seen in FIG. 3B). In some examples, the seal formed by seal 116 is the only seal formed between door 24 and housing 22 by a component other than the material of door 24 and the material of housing 22. Door 24 can be configured such that connectors 100 remain connected to drive housing 22 as door 24 pivots but seal 116 lifts away from and off of housing 22 as door 24 pivots to the open state. Seal 116 can reengage with housing 22 as door 24 pivots to the closed state.

Battery 68 is mounted to back wall 92 at mounting slot 72 such that air gaps are formed on five of the six sides of battery 68. Battery 68 rests on ledge 131, which can be formed by electrical contacts. Gap 102a is disposed between battery 68 and base wall 94, gap 102b is disposed between battery 68 and door lateral wall 80a, gap 102c is disposed between battery 68 and door lateral wall 80b, gap 102d is disposed between battery 68 and top wall 78, and gap 102e is disposed between battery 68 and front wall 82. The height of door 24 is greater than the height of battery 68, the lateral width of door 24 (between door lateral walls 80a, 80b) is wider than the width of battery 68, and the longitudinal length of door 24 along top wall 78 is greater than the length of battery 68. The height of battery compartment 70 between base wall 94 and top wall 78 of door 24 is taller than the height of battery 68 when taken at any position along base wall 94. The width of battery compartment 70 between door lateral walls 80a, 80b is larger than the width of battery 68 when taken at any position within battery compartment 70. The length of battery compartment between back wall 92 and front wall 82 is greater than the length of battery 68. It is understood that fluid sprayer 12 is configured such that batteries of different sizes and dimensions can be mounted to battery slot 72 to provide electric power to fluid sprayer 12. In each case, the batteries do not contact door 24 and do not contact base wall 94.

Base wall 94 is sloped between the intersection of base wall 94 and back wall 92 and front end 122 of base wall 94, which front end 122 is at an opposite longitudinal end of base wall 94 from that intersection. Gap 102a widens in the longitudinal direction between the intersection between base wall 94 and back wall 92 and front end 122 of base wall 94. Base wall 94 is formed by base lateral portion 118a and base lateral portion 118b being joined together. Base lateral portion 118a slopes downward, away from battery 68, from the interface between base lateral portion 118a and base lateral portion 118b to base lateral edge 120a. Similarly, base lateral portion 118b slopes downward, away from battery 68, from the interface between base lateral portion 118a and base lateral portion 118b to the base lateral edge 120b. As such, base wall 94 slopes away from battery 68 in three directions. With door 24 closed, base wall 94 is sloped away from battery 68 and towards each of front wall 82, door lateral wall 80a, and door lateral wall 80b. The slope of base wall 94 guides any fluid that may enter into battery compartment 70 away from battery 68.

With door 24 in the closed state, lip 86 overlaps with housing 22 such that tortuous seams are formed between door 24 and base wall 94 at interface 128a and interface 128b. Interface 128a is formed between the portion of lip 86 extending from door lateral wall 80a and the base lateral edge 120a. Interface 128b is formed between the portion of lip 86 extending from door lateral wall 80b and base lateral edge 120b. The seam at interface 128a includes a vertical portion and a horizontal portion. Similarly, the seam at interface 128b includes a vertical portion and a horizontal portion. The tortuous seams inhibit fluid migration into battery compartment 70 during spraying, protecting battery 68 from the spray fluid. The fluid would need to travel vertically upwards, against gravity, and then horizontally to enter into battery compartment 70 through the seams formed at either of interface 128a or interface 128b. Sealing material, such as elastomer seals, are not disposed in the seals formed between lip 86 and base lateral portion 118a or between lip 86 and base lateral portion 118b. The absence of sealing material allows for fluid migration out of battery compartment 70 at interfaces 128a, 128b.

Drainage gap 130 is formed between lip 86 and the front end 122 of base wall 94. Drainage gap 130 facilitates draining of any fluid that does enter into battery compartment 70. Drainage gap 130 overlaps with depressions 98 to facilitate draining at the corners of base wall 94, away from battery 68. Drainage gap 130 also allows air to enter into battery compartment 70, which can assist in cooling.

Back wall 92 is sloped between hinge 26 and the intersection of base wall 94 and back wall 92, as discussed in more detail above. Battery 68 is supported by and hangs from mounting slot 72. A portion of battery 68 can project above mounting slot 72 and can be spaced from back wall 92 to form a gap therebetween. Base wall 94 is formed by back lateral portion 124a and back lateral portion 124b being joined together. Back lateral portion 124a slopes rearward, away from battery 68, between the interface of back lateral portion 124a and back lateral portion 124b and back lateral edge 126a. Similarly, back lateral portion 124b slopes rearward, away from battery 68, between the interface of back lateral portion 124a and back lateral portion 124b and the back lateral edge 126b. As such, back wall 92 slopes away from battery 68 in each lateral direction. The slope of back wall 92 prevents any fluid that does infiltrate battery compartment 70 from between lip 86 and back wall 92 form wicking to battery 68.

With door 24 in the closed state, lip 86 overlaps with housing 22 such that tortuous seams are formed between door 24 and back wall 94 at interface 128c and interface 128d. Interface 128c is formed between the portion of lip 86 extending from door lateral wall 80a and the back lateral edge 126a. Interface 128d is formed between the portion of lip 86 extending from door lateral wall 80b and back lateral edge 126b. The seam at interface 128c includes a longitudinal portion and a lateral portion. Similarly, the seam at interface 128d includes a longitudinal portion and a lateral portion. The tortuous seams inhibit fluid migration into battery compartment 70 during spraying, protecting battery 68 from the spray fluid. The fluid would need to travel longitudinal and then laterally to enter into battery compartment 70 through the seams formed at either of interface 128c or interface 128d. Sealing material, such as elastomer seals, are not disposed in the seals formed between lip 86 and back lateral portion 124a or between lip 86 and back lateral portion 124b.

Fluid sprayer 12 provides significant advantages. A gasket seal is formed between door 24 and housing 22 proximate the uppermost interface between door 24 and housing 22. The gasket seal provides a fluid tight seal that prevents fluid migration into battery compartment 70 at a location vertically above top opening 110 of mounting slot 72, thereby preventing fluid from reaching battery 68. Other interfaces between door 24 and housing 22 on the lateral sides of battery compartment 70 form tortuous pathways that inhibit fluid migration into battery compartment 70 while allowing fluid to flow out of battery compartment 70 through those interfaces. Drainage gap 130 at the front longitudinal end of battery compartment 70 provides an opening for fluid to exit from battery compartment 70. Base wall 94 is contoured to route fluid away from battery 68 and out of battery compartment 70. The contouring of base wall 94 prevents fluid accumulation in battery compartment 70, preventing wicking of the fluid to the moisture sensitive battery 68. The contouring of back wall 92 also prevents fluid wicking to the moisture sensitive battery 68.

Figure 5A:
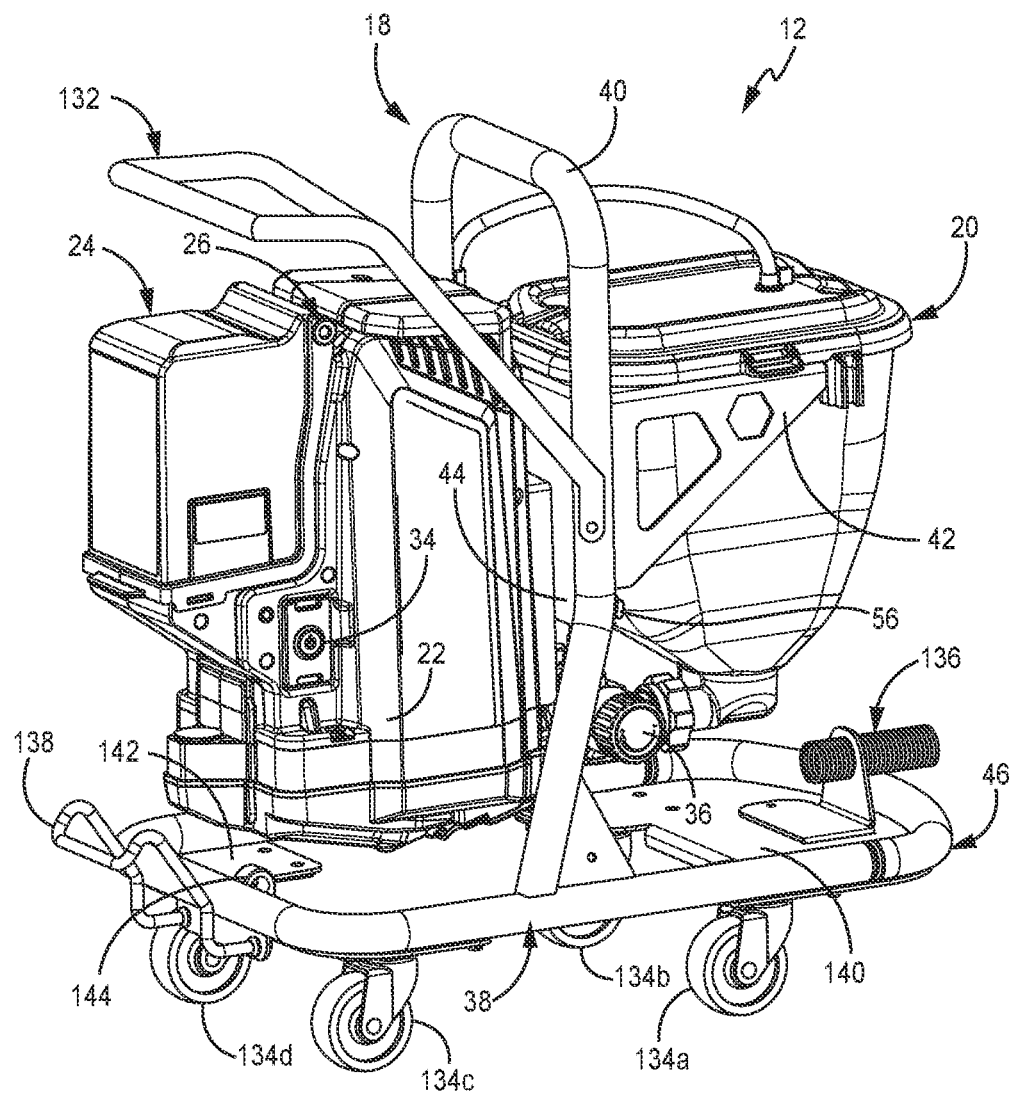
FIG. 5A is a first isometric view of a fluid sprayer.
Figure 5B:
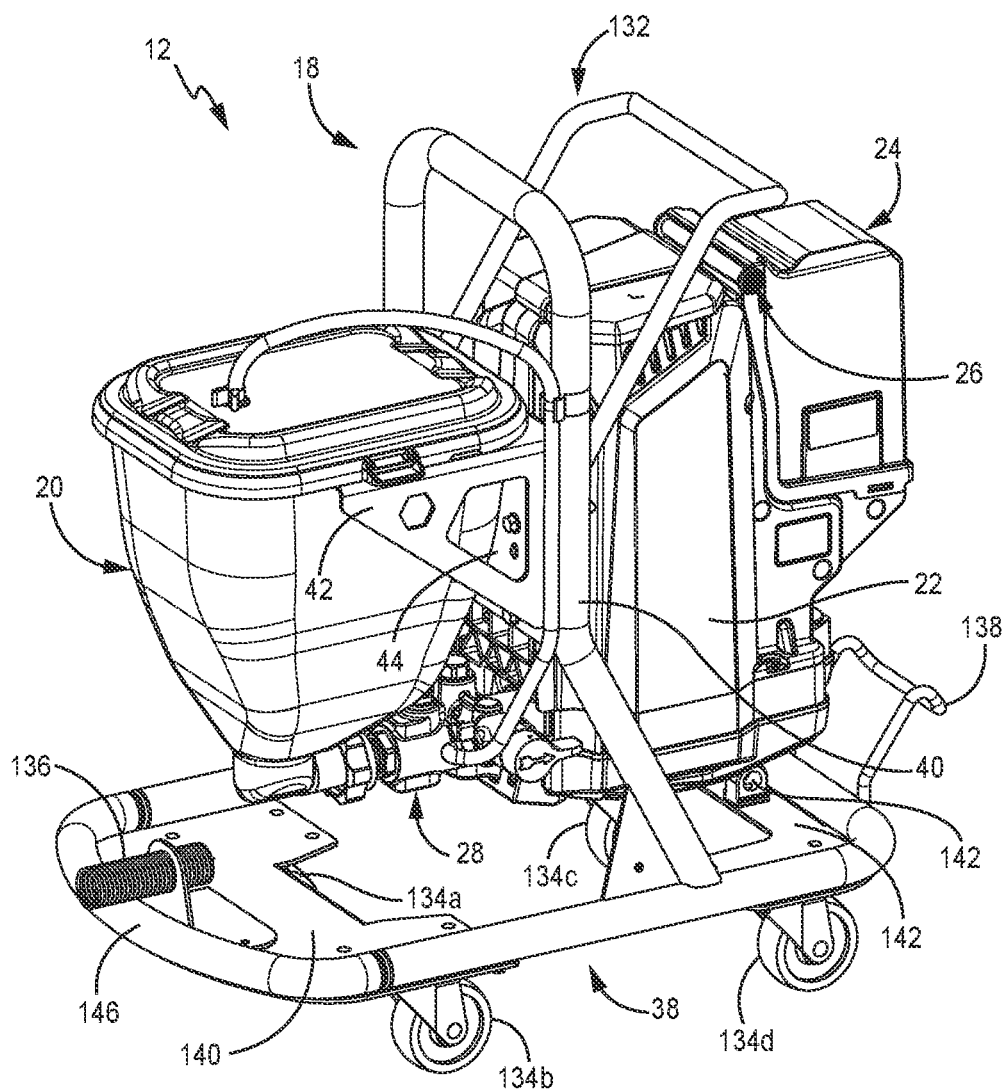
FIG. 5B is a second isometric view of the fluid sprayer.

FIG. 5A is a first isometric view of fluid sprayer 12. FIG. 5B is a second isometric view of fluid sprayer 12. FIGS. 5A and 5B will be discussed together. Frame 18, reservoir 20, housing 22, door 24, hinge 26, pump 28, switch 34, and pressure control 36 of fluid sprayer 12 are shown. Frame 18 includes base portion 38, vertical portion 40, brackets 42, plate 44, handle 132, wheels 134a-134d, hose guide 136, extension 138, front plate 140, rear plate 142, hose clamp 144, and bumper 146. Reservoir 20 includes reservoir body 48 and lid 50. Pump body 52 and pump outlet 56 of pump 28 are shown.

Frame 18 supports other components of fluid sprayer 12 on a ground surface. Base portion 38 is disposed generally horizontally, parallel to the ground surface. Base can be formed from metallic tubing, among other options. Wheels 134a-134d extend from a bottom side of base portion 38 and are configured to contact the ground surface. In some examples, each of wheels 134a-134d can be caster wheels that support fluid sprayer 12. In some examples, a first pair of the wheels at one longitudinal end of base portion 38 (e.g., a pair formed by wheel 134a and wheel 134b, or a pair formed by wheel 134c and wheel 134d) can be fixed to rotate only a single axis while a second pair of the wheels (e.g., the other of wheel 134c and wheel 134d, or wheel 134a and wheel 134b) can be casters that can also rotate about a second, vertical axis.

Front plate 140 spans between the lateral legs of base portion 38 and is connected to base portion 38. Front plate 140 is connected to the tubing forming base portion 38. For example, front plate 140 can be bolted, welded, or otherwise connected to the tubing forming base portion 38. Wheels 134a, 134b are connected to and extend from front plate 140. Bumper 146 extends between the lateral legs of base portion 38. Bumper 146 extends longitudinally relative to base portion 38. Bumper 146 can be connected to and supported by front plate 140. In the example shown, bumper 146 is formed by tubing that is connected to and supported by the front plate 140. For example, bumper 146 can be welded or clamped to base portion 38 or front plate 140. Bumper 146 can extend longitudinally beyond reservoir 20 such that bumper 146 would contact a vertical surface (e.g., a wall) prior to reservoir 20 to thereby protect reservoir 20.

Hose guide 136 is supported by front plate 140. Hose guide 136 projects longitudinally beyond reservoir 20 and bumper 146. Hose guide 136 is formed as a spring that defines a pathway through which the spray hose, such as hose 14, can extend. Hose guide 136 prevents kinking of the spray hose during operation. For example, the spray hose can be wrapped around sprayer 12 to store unused spray hose length on sprayer 12 and the desired operating length can be fed through the spring of hose guide 136. Hose guide 136 can be aligned on a longitudinal centerline of sprayer 12. As such, hose guide 136 can align sprayer 12 on a desired travel path rather than pulling sprayer 12 to a lateral side. In some examples, hose guide 136 is removably mounted to front plate 140. Hose guide 136 can be detached from front plate 140 to facilitate shortening or lengthening the spray hose extending out through hose guide 136, which is the length of hose extending away from sprayer 12. For example, hose guide 136 can be detached from front plate 140, the hose can be unwound from around sprayer 12, additional length can be fed through hose guide 136, and hose guide 136 can then be reattached to front plate 140 to set the available length of the spray hose. The available length of the hose can be decreased in a similar manner by pulling the hose through hose guide 136 and wrapping the unused length around sprayer 12 prior to reattached the hose guide 136.

Rear plate 142 spans between the lateral legs of base portion 38 and is connected to base portion 38. Rear plate 142 is connected to the tubing forming base portion 38. For example, front plate 140 can be bolted, welded, or otherwise connected to the tubing forming base portion 38. Rear plate 142 is disposed at an opposite longitudinal end of base portion 38 from front plate 140. Wheels 134c, 134d are connected to and extend from rear plate 142. Hose clamp 144 is disposed on a top side of rear plate 142. The spray hose extends from pump outlet 56, wraps at least partially around fluid sprayer 12, and extends through hose clamp 144. Hose clamp 144 protects pump 28. If the spray hose is pulled, then the force is experienced by hose clamp 144 instead of by pump outlet 56.

Extension 138 extends longitudinally relative to base portion 38. In the example shown, extension 138 extends from the opposite longitudinal end of base portion 38 from bumper 146. Extension 138 is connected to a portion of rear plate 142 projecting below a bottom edge of the tubing forming base portion 38. Extension 138 forms a kick start that facilitates lifting fluid sprayer 12 to navigate over transitions, stairs, and other obstacles. For example, the user can place a foot on extension 138 and exert a downward force to lift wheels 134a, 134b off of the ground and can then push fluid sprayer 12 forward on wheels 134c, 134d to navigate over a transition. The kick start provided by extension 138 eases maneuvering of fluid sprayer 12 and provides for an efficient, quick spray process. Extension 138 is further configured to store hose 14 (FIG. 1A) when fluid sprayer 12 is not in use. The hose can be wrapped around extension 138 for storage.

Vertical portion 40 extends generally vertically from a top side of base portion 38 and is at least partially disposed between housing 22 and reservoir 20. Brackets 42 extend from the legs of vertical portion 40 and plate 44 extends laterally between the legs of vertical portion 40. Reservoir 20 is supported by brackets 42. Housing 22 is mounted to plate 44. Handle 132 is connected to vertical portion 40 and extends longitudinally from vertical portion 40. In some examples, handle 132 can be connected to each leg of vertical portion 40. The user can grasp handle 132 to push and/or pull fluid sprayer 12. Handle 132 can be mounted to either longitudinal side of vertical portion 40. While handle 132 is shown as projecting over housing 22, handle 132 can be mounted to vertical portion 40 to project over the top of reservoir 20. In some examples, handle 132 can be connected to only one leg of vertical portion 40. Handle 132 can be removably connected to vertical portion 40. For example, handle 132 can include a clamp configured to wrap at least partially around a leg of vertical portion 40 to secure handle 132 to vertical portion 40. In some examples, handle 132 can be bolted or otherwise fastened to vertical portion 40. While handle 132 is shown extending from vertical portion 40, it is understood that some examples of the wheeled fluid sprayer 12 do not include handle 132. In such examples, vertical portion 40 can itself function as a handle of fluid sprayer 12. For example, the user can grasp the horizontal leg of vertical portion 40 to maneuver the wheeled sprayer 12.

Fluid sprayer 12 provides significant advantages. Fluid sprayer 12 is supported on the ground surface by wheels 134a-134d and can be easily maneuvered around the job site. Wheeling fluid sprayer 12 around job site allows the user to continuously spray without having to stop spraying, pick up fluid sprayer 12, and reposition fluid sprayer 12. The user can push fluid sprayer 12 ahead of the user or pull fluid sprayer 12 behind the user and continue spraying. Such maneuverability is particularly useful in instances where the user is spraying multiple rooms and surfaces, such as where the spray fluid is a sanitary spray fluid.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A fluid sprayer comprising:
an electric motor;
a battery supported by a drive housing and electrically connected to the electric motor to provide power to the electric motor, wherein the drive housing is supported by a frame of the fluid sprayer; and
a pump operatively connected to the electric motor to be driven by the electric motor;
wherein the battery is mounted in a battery compartment at least partially defined by the drive housing;

a door connected to the drive housing and further defining the battery compartment, the door movable between an open state, during which the battery is exposed, and a closed state, during which the battery is enclosed within the battery compartment, wherein:
   the door includes a first lateral side and a second lateral side; and
   the door extends past an edge of the drive housing such that at least a portion of the drive housing is located directly between the first lateral side and the second lateral side with the door in the closed state.

2. The fluid sprayer of claim 1, further comprising:
a reservoir supported by the frame of the fluid sprayer, wherein the pump is configured to pump fluid from a reservoir.

3. The fluid sprayer of claim 2, wherein the electric motor is disposed between the battery and the reservoir.

4. The fluid sprayer of claim 1, wherein the door is hinged to move between the open state and the closed state.

5. The fluid sprayer of claim 4, wherein the door includes a seal groove extending laterally and disposed proximate a hinge connecting the door to the drive housing, and wherein a seal is disposed in the seal groove, the seal configured to interface with the drive housing with the door in the closed state.

6. The fluid sprayer of claim 1, wherein the door includes a lip extending from a periphery of the door, the lip configured to overlap with a portion of the drive housing with the door in the closed state.

7. The fluid sprayer of claim 1, wherein the battery compartment includes a back wall and a base wall, and wherein the battery is mounted to the back wall.

8. The fluid sprayer of claim 7, wherein the battery is configured to mount to the drive housing by a sliding interface.

9. The fluid sprayer of claim 7, wherein the battery compartment further comprises a front wall, a first side wall, a second side wall, and a top wall, and wherein the battery is mounted such that an air gap is disposed between the battery and each of the front wall, the first side wall, the second side wall, the top wall, and the base wall.

10. The fluid sprayer of claim 7, wherein the electric motor is disposed within the drive housing, and wherein the back wall forms a portion of the drive housing.

11. The fluid sprayer of claim 7, wherein the battery compartment includes at least one drainage depression.

12. The fluid sprayer of claim 11, wherein the at least one drainage depression is disposed at a lip of the base wall, the lip disposed at an opposite end of the base wall from an intersection between the base wall and the back wall.

13. The fluid sprayer of claim 7, wherein the base wall is sloped downward from an intersection between the base wall and the back wall to a lip of the base wall.

14. The fluid sprayer of claim 7, wherein:
the base wall includes a first base wall lateral side and a second base wall lateral side;
the first base wall lateral side is sloped downward from an intersection between the first base wall lateral side and the second base wall lateral side to a first lateral edge of the base wall; and
the second base wall lateral side is sloped downward from the intersection between the first base wall lateral side and the second base wall lateral side to a second lateral edge of the base wall.

15. The fluid sprayer of claim 1, wherein:
the pump is a piston pump having a piston configured to reciprocate along a reciprocation axis;
a base of the frame is spaced in a first vertical direction relative to the reciprocation axis; and
the battery is spaced in a second vertical direction from the reciprocation axis, the second vertical direction being opposite the first vertical direction.

16. The fluid sprayer of claim 1, wherein at least a portion of the battery is disposed vertically above the electric motor, and wherein the electric motor is disposed vertically above a piston of the pump.

17. The fluid sprayer of claim 1, wherein an outlet of the pump is disposed vertically between a piston of the pump and the battery.

18. The fluid sprayer of claim 1, wherein the frame includes a plurality of wheels configured to support the fluid sprayer on a ground surface.

19. A mounting assembly for a fluid sprayer comprising:
a drive housing containing an electric motor;
a door movably connected to the drive housing, the door configured to move between a closed state and an open state; and
a battery compartment having a base wall formed by the drive housing, a back wall formed by the drive housing, and further defined by the door;
wherein the back wall is configured to support a battery within the battery compartment such that air gaps are formed between the battery and the base wall and between the battery and the door and such that the battery does not contact any of the base wall and the door;
wherein, with the door in the closed state, the door extends below the battery such that an air gap directly between the base wall and the battery is disposed directly between opposed walls of the door.

* * * * *